July 29, 1958 W. G. TAYLOR ET AL 2,845,249
EXHAUST CASING ASSEMBLY FOR GAS TURBINE POWERPLANT
Filed March 27, 1957
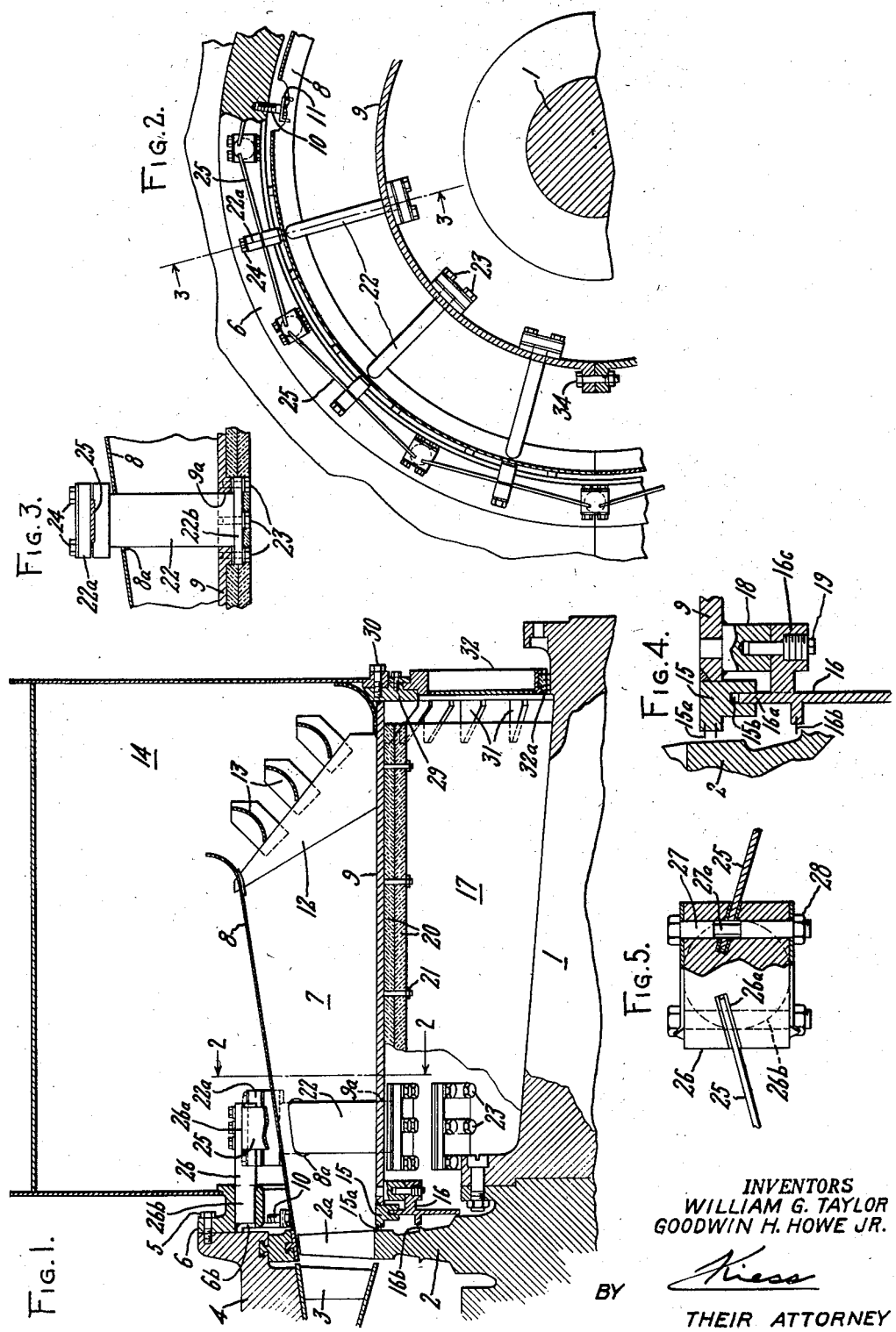
INVENTORS
WILLIAM G. TAYLOR
GOODWIN H. HOWE JR.
BY
THEIR ATTORNEY United States Patent Office 2,845,249
Patented July 29, 1958

2,845,249

EXHAUST CASING ASSEMBLY FOR GAS TURBINE POWERPLANT

William G. Taylor, Scotia, and Goodwin H. Howe, Jr., Ballston Lake, N. Y., assignors to General Electric Company, a corporation of New York Application March 27, 1957, Serial No. 648,963

7 Claims. (Cl. 253—39)

This invention relates to gas turbine powerplants, particularly to an exhaust casing assembly for directing the exhaust gases from the last stage turbine bucket wheel to the exterior of the turbine.

A gas turbine powerplant will ordinarily be provided with an exhaust casing assembly which includes an annular duct for the passage of exhaust gases from the last stage bucket wheel to an exhaust hood from where the gases flow to the atmosphere or to some other component for utilizing some of the remaining heat energy in the exhaust gas. The duct may be supported from a main turbine support member normally located at a place remote from the gas path so it is not exposed to the high temperatures of the hot exhaust gases. However, while the main support member is not exposed to the high exhaust gas temperatures, major consideration must be given to the structure for supporting the exhaust duct relative to the main support member in order to permit free differential thermal expansion between the exhaust duct and turbine casing. This is necessary to prevent undesirable deformation of the duct or material alteration of the clearances between the exhaust casing assembly and the rotor. It has been the practice, where a bearing is supported by the exhaust casing, to provide a ring member to support the bearing, secure the exhaust duct to the ring member, and provide a plurality of radial struts for rigidly connecting the ring member to the main turbine casing. In this design, the exhaust duct is free to flex and the bearing support maintains the desired clearances between the exhaust casing assembly and the rotor. The bearing support ring is maintained relatively free from differential thermal expansion relative to the rotor by providing cooling air to cool the struts and the support ring. Such an arrangement is illustrated in detail in U. S. Patent 2,591,399, issued April 1, 1952, to B. O. Buckland and Alan Howard and assigned to the assignee of the present invention.

However, in turbine designs where there is no bearing supported by the exhaust casing, the need for a bearing support member is eliminated and the exhaust duct may be supported directly from the turbine casing. This arrangement requires that the exhaust duct be permitted to expand freely with temperature changes, while maintaining the desired seal between the exhaust casing and turbine rotor.

Accordingly, it is an object of this invention to provide an exhaust casing assembly including an exhaust duct assembly which is supported from the turbine casing and permitted to expand freely relative thereto to prevent the transmission of excessive deforming forces to the casing while maintaining satisfactory clearances between the duct assembly and the adjacent bucket wheel.

A further object is to provide a flexible support means for maintaining the exhaust duct assembly concentric with respect to the adjacent bucket wheel while permitting differential thermal expansion between the exhaust duct and the turbine casing member supporting the duct.

Other objects and advantages will become apparent from the following description taken in connection with the accompanying drawings in which:

Fig. 1 is a sectional view of the exhaust casing assembly including the exhaust duct which is supported from the main turbine casing in accordance with our invention;

Fig. 2 is an end view taken along the lines 2—2 of Fig. 1;

Fig. 3 is a view taken along lines 3—3 of Fig. 2;

Fig. 4 is an enlargement illustrating the sealing means for restricting the leakage of gas between the bucket wheel and exhaust duct; and Fig. 5 is a sectional view of a detail of the exhaust casing support structure.

Generally stated, the present invention is practiced by providing an annular exhaust duct assembly adjacent the last stage bucket wheel, with an inner cylindrical frame member supported in concentric relationship relative to the bucket wheel by a plurality of radial cantilever beam members which extend through the duct and are resiliently mounted relating to the turbine casing to permit the cylindrical member to expand relative to the turbine casing in response to differential thermal expansion therebetween.

Referring now more particularly to Fig. 1, the powerplant includes a rotor 1 having secured thereto a bucket wheel 2 containing a row of buckets 2a. The motive gas flowing through the turbine is directed from the nozzle blades 3 to the buckets 2a and then through the exhaust casing assembly to be described later in detail.

The main turbine casing 4 which supports the nozzle blades 3 has connected thereto, by bolts 5, a main frame ring 6 to which the exhaust casing assembly is connected. The turbine casing 4 and ring 6 are not integral annular members but are formed in two halves divided along a horizontal plane through the axis of the turbine and secured together by a plurality of threaded fastenings (not shown).

The exhaust casing assembly includes an annular duct 7 which is formed between a thin, flexible, somewhat conical outer wall 8 and a substantially thicker inner frame cylinder member 9. Cylindrical wall member 9 is of sufficiently thick section so as to be considered a rigid cylinder as compared with cone 8. The walls 8, 9 are made in two halves as illustrated in Fig. 2 and connected by suitable fastenings 34. The outer wall 8 is secured at its left-hand end to the support ring 6 by bolts 10 which extend loosely through brackets 11 that are welded to the outer surface of wall 10 (see Fig. 2). The bolts 10 are radially spaced from wall 8 to permit movment of wall 8. The other end of wall 8 is located relative to inner wall 9 by radially and axially extending struts 12. Wall 8 is not secured to struts 12 and thus it can be seen that wall 8 is free to expand relative to main frame ring 6 when subject to differential thermal expansion. Struts 12 have welded thereto guide vanes 13 which direct the exhaust gases smoothly outward into the exhaust hood 14.

Skipping for a moment the structure for supporting the inner wall 9 with respect to the casing 4, to which this invention particularly relates, it is noted that the inner wall 9 also serves as a frame member to support a "sealing plate" assembly for restricting the leakage of exhaust gases into the space 17 defined between wall 9 and rotor 1. This sealing assembly, which is illustrated more clearly in Fig. 4, includes a first ring 15 made in two halves welded to wall 9. Ring 15 includes axially extending seals 15a that restrict the flow of exhaust gases between ring 15 and bucket wheel 2. Also included is a second annular plate 16 having a circumferential portion 16a that extends radially into recess 15b for locating ring 16, and an annular seal portion 16b to further prevent the flow of exhaust gases into the space 17 defined between wall 9 and rotor 1. Ring 16 is connected to wall 9 by a plurality of radial studs 19 which extend through lugs 16c (Fig. 4) into bosses 18 which are welded to wall 9.

The fit between flange 16a and ring 15, and the fit between stud 19 and boss 18 is such that inner wall 9 is free to expand relative to the sealing assembly ring 16 while an effective seal is maintained between wheel 2 and ring 16. It is desired to direct attention to the fact that the sealing plate assembly 16 is not to any great degree exposed to the hot exhaust gases and thus is substantially free of thermal expansion.

To retain an effective seal it is important that the annular wall 9 be maintained concentric relative to wheel 2 since if wall 9 is permanently distorted as a result of preventing free differential thermal expansion between it and support ring 6, the clearances between wheel 2 and rings 15, 16 will be materially altered. Therefore, in accordance with our invention, we provide a novel arrangement which supports the inner wall 9 from the main frame ring 6 so as to permit differential thermal expansion of struts 22 and frame cylinder 9 relative to ring 6 while maintaining wall 9 concentrically disposed with respect to rotor 1 and bucket wheel 2.

Our novel support means includes a plurality of struts 22 which extend radially through openings 9a in inner wall 9, across duct 7, and freely through openings 8a in outer wall 8. The inner ends of struts 22 are rigidly secured to the inner wall 9 by bolts 23 which extend through plate 22b that is welded to struts 22. Struts 22 are designed with such a heavy cross-section as to withstand transverse loading as a beam without substantial deflection. As may be seen in Fig. 1, opening 8a is slightly larger than strut 22 to prevent binding between wall 8 and strut 22 when they are subjected to differential thermal expansion. Struts 22 are clamped at their outer ends by clamping plate 22a and bolts 24 to the middle of plate spring 25 (see Figs. 2 and 3). The outer ends of each plate spring 25 are located in slots 26a of beam 26 and are fixed therein by bolts 27 and nuts 28 (see Fig. 5). The opposite end 26b of beam support 26 is located in openings 6a in support ring 6 and is welded thereto to prevent them from being displaced. The undercut 27a of bolt 27 permits a slight movement of spring 25 to prevent an S-curve from being formed therein when it is flexed during thermal expansion of strut 22 and wall 9. Such bending of the spring 25 at the beams 26, if permitted, would result in the setting up of excessive stresses in springs 25. In the embodiment shown, the struts 22 are located at 30° intervals, thus calling for twelve struts 22 and twelve resilient supporting assemblies. However, this is by way of example only since a different number may be utilized.

It can be appreciated that with this design, the annular wall 9 is maintained exactly concentric with respect to the support ring 6 and the rotor 1 and bucket wheel 2. That is to say, wall 9 is free to radially expand and load the plate springs 25 in bending, but any force tending to displace wall 9 out of concentric relationship is prevented by the struts displaced at 90° from the displacing force. The struts due to their heavy cross-section and rigid connection to wall 9 take the loads imposed thereon without substantial deflection. Essentially, the struts are loaded as cantilever beams through plate springs 25, which are loaded in tension.

It remains to note that inner wall 9 is welded at its extreme right-hand end to ring 29 which is connected to exhaust hood 14 by bolts 30, and wall 9 is supported relative to ring 29 by gussets 31. Seal mounting ring 32 containing packing 32a is secured to ring 29 and cooperates with rotor 1 to prevent the leakage of exhaust gases out of chamber 17. Also, chamber 17 and the components contained therein are insulated from the hot exhaust gases by annular insulating walls 20 secured to inner wall 9 by threaded fastenings 21.

Thus it can be seen that the invention provides a support for an exhaust duct relative to the turbine casing which permits the annular exhaust duct to radially expand in response to differential thermal expansion relative to the turbine casing but which effectively maintains the duct in concentric relationship relative to the turbine casing and bucket wheel. This construction further enables the desired clearances to be maintained between the exhaust duct assembly and bucket wheel to limit the escape of exhaust gases from the main flow path.

It will be obvious to those skilled in the art that numerous other changes and substitutions of mechanical equivalents might be made in the construction of the exhaust casing assembly. It is, of course, desired to cover by the appended claims all such modifications as fall within the true spirit and scope of the invention.

What we claim as new and desire to secure by Letters Patent of the United States is:

1. For use in a high temperature turbine powerplant having a rotor with an axial flow bucket wheel, a main frame member, an exhaust casing assembly comprising radially spaced inner and outer walls which define an annular discharge passage for the bucket wheel, a plurality of circumferentially spaced struts each having a first end portion secured to the inner wall and extending radially outward through the turbine discharge passage, and a second end portion extending through an opening defined by said outer wall, and resilient means secured to the frame member and the second end portions of the struts for supporting the struts from said main frame member whereby the inner wall is free to change dimensions and deflect as necessary to permit differential thermal expansion relative to the main frame member.

2. A high temperature powerplant having a turbine rotor with at least one axial flow bucket wheel, a first support member, an exhaust casing assembly disposed adjacent the bucket wheel and having radially spaced concentrically disposed inner and outer walls defining an annular turbine discharge passage for the bucket wheel, second means for supporting the exhaust casing from the support member whereby the inner and outer wall are free to expand and contract in response to differential thermal expansion between the casing and support member, the second support means for supporting the exhaust casing from the turbine support member comprising a plurality of circumferentially spaced struts each having a first end portion secured to the inner wall and extending radially outward through the turbine discharge passage, and a second end portion extending through an opening defined by said outer wall, and resilient means secured to the struts and support member for supporting the struts from the support member, the resilient means comprising a plurality of circumferentially disposed leaf springs secured at their ends to the first support member and at their midpoints to the struts to permit the struts and inner wall to expand while maintaining the inner wall concentric with respect to the bucket wheel.

3. A high temperature turbine powerplant having a rotor with an axial flow bucket wheel, a main support member, an exhaust casing assembly comprising radially spaced inner and outer walls to define an annular turbine discharge passage for the bucket wheel, sealing means located outside the discharge passage and disposed adjacent the bucket wheel to prevent leakage between the bucket wheel and inner wall, second support means secured to the inner wall and cooperating with the sealing means for supporting the sealing means relative to the inner wall, and third means supporting the inner wall from the main support member, said third means including a plurality of circumferentially spaced struts each having a first end portion secured to the inner wall and extending radially outward through the turbine discharge passage and a second end portion extending through an opening defined by the outer wall, and means secured to the second end portion of the struts and the main support member for resiliently supporting the struts from the first support member whereby the exhaust casing is free to change its dimension as necessary to permit differential thermal expansion between the inner wall and the first support member.

4. For use in a high temperature gas turbine powerplant having a rotor with an axial flow bucket wheel, and a first main turbine support member, an exhaust casing assembly comprising an outer wall fabricated of a comparatively thin flexible sheet, and an inner wall which together with said outer wall defines an annular discharge passage, second means slidably securing said outer wall to said first support member to permit differential thermal expansion therebetween, and third means supporting the inner wall from the main support member whereby the inner wall is free to expand relative to the main turbine support member in response to differential thermal expansion, the third means comprising a plurality of circumferentially spaced struts each having a first end portion secured to the inner wall and extending through the turbine discharge passage and a second end portion extending through an opening defined by the outer wall, and spring means secured to the main support member and the second end portion of the struts for supporting the struts from the main support member.

5. A high temperature turbine powerplant having a rotor with an axial flow bucket wheel, a first main support means, an exhaust casing assembly located adjacent the bucket wheel and having radially spaced inner and outer walls which define an annular discharge passage for the bucket wheel, second means slidably securing the outer wall to the first support means to permit differential thermal expansion therebetween, third means supporting the exhaust casing from the first support means whereby the inner wall is free to expand and contract in response to differential thermal expansion relative thereto, said third support means comprising a plurality of circumferentially spaced struts each having a first end portion secured to the inner wall and extending radially outward through the turbine discharge passage, and a second end portion extending through an opening defined by the outer wall, and resilient means supporting the struts from the first support means, the resilient means comprising a plurality of circumferentially disposed leaf springs secured at their ends to the first support means and at their midpoints to the struts to permit the inner wall to expand while maintaining the inner wall of the discharge passage concentric with respect to the bucket wheel, sealing means located radially within the inner exhaust casing wall and disposed adjacent the bucket wheel to prevent leakage between the bucket wheel and inner wall, and fourth means cooperating with the sealing means and inner wall for supporting the sealing means relative to the inner wall, whereby the inner wall is free to expand relative to the sealing means without affecting the seal between the inner wall and bucket wheel.

6. A high temperature turbine powerplant having a rotor with an axial flow bucket wheel, a main frame ring member substantially surrounding the bucket wheel, and exhaust casing assembly located adjacent the bucket wheel and having a rigid generally cylindrical inner wall member and a radially spaced relatively thin and flexible outer wall which together define an annular discharge passage for the bucket wheel, the inner and outer walls defining radially aligned openings, a plurality of circumferentially spaced struts each having an inner end portion located adjacent the inner wall, each strut extending radially across said discharge passage and having an outer end portion projecting freely through an opening in the thin outer wall, means rigidly connecting the inner end portions of the struts to the cylindrical inner wall member, and resilient means secured to the outer end portions of said struts and the main frame member to flexibly connect the struts to the main frame ring member, whereby the inner cylindrical wall member is free to change dimensions radially relative to the main frame ring member in response to thermal changes.

7. A high temperature powerplant having a turbine rotor with at least one axial flow bucket wheel, a main frame ring supporting a first annular row of circumferentially spaced axially extending cantilever beam members, an exhaust casing having a rigid generally cylindrical inner wall member coaxial with the rotor and a radially spaced outer wall member defining therebetween an annular discharge passage for the bucket wheel, a plurality of circumferentially spaced struts each having an inner end portion rigidly fixed to said inner wall member and extending radially outward across the turbine discharge passage with a second end portion extending freely through an opening defined by said outer wall member, means resiliently supporting the second end portions of said struts from the ends of said cantilever beam members, said resilient support means each comprising a leaf spring member secured at its midpoint to the outer end of one of said struts and at its respective ends to an adjacent pair of said first cantilever beams.

References Cited in the file of this patent

UNITED STATES PATENTS

| 1,900,128 | Persons | Mar. 7, 1933 |
| 2,616,662 | Mierley | Nov. 4, 1952 |
| 2,620,157 | Mosley et al. | Dec. 2, 1952 |

FOREIGN PATENTS

| 126,196 | Sweden | Sept. 20, 1949 |